United States Patent
Griffin et al.

(10) Patent No.: US 10,778,450 B1
(45) Date of Patent: Sep. 15, 2020

(54) GESTURE-EXTRACTED PASSWORDS FOR AUTHENTICATED KEY EXCHANGE

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 323 days.

(21) Appl. No.: 15/961,533

(22) Filed: Apr. 24, 2018

Related U.S. Application Data

(60) Provisional application No. 62/492,070, filed on Apr. 28, 2017.

(51) Int. Cl.
  *H04L 9/32* (2006.01)
  *H04L 9/08* (2006.01)

(52) U.S. Cl.
  CPC .......... *H04L 9/3271* (2013.01); *H04L 9/0844* (2013.01); *H04L 9/0861* (2013.01); *H04L 9/3231* (2013.01); *H04L 2463/082* (2013.01)

(58) Field of Classification Search
  CPC ... H04L 9/3271; H04L 9/0861; H04L 9/0844; H04L 2463/082
  USPC ................................................. 713/168, 171
  See application file for complete search history.

(56) References Cited

U.S. PATENT DOCUMENTS

| | | | |
|---|---|---|---|
| 7,813,822 B1 * | 10/2010 | Hoffberg | G06K 9/00369 381/73.1 |
| 7,877,707 B2 | 1/2011 | Westerman et al. | |
| 8,353,764 B2 | 1/2013 | Williams et al. | |
| 8,458,485 B2 | 6/2013 | Bandyopadhyay et al. | |
| 8,638,939 B1 * | 1/2014 | Casey | G06F 21/36 380/277 |
| 8,910,253 B2 | 12/2014 | Johnson et al. | |
| 8,941,466 B2 | 1/2015 | Bayram et al. | |
| 8,988,187 B2 | 3/2015 | Wong et al. | |
| 9,020,567 B2 | 4/2015 | Fyke | |
| 9,195,813 B2 * | 11/2015 | Hrybyk | G06F 21/31 |

(Continued)

OTHER PUBLICATIONS

Griffin, Phillip, "Secure Authentication on the Internet of Things," IEEE Southeast Conference (2017). 5 pages.

(Continued)

*Primary Examiner* — Samson B Lemma
(74) *Attorney, Agent, or Firm* — Foley & Lardner LLP

(57) ABSTRACT

A method for gesture-based multi-factor authentication includes receiving a gesture password from a user. The gesture password is mapped to a first substitution string. A cryptographic key is generated using the substitution string as an input to a password authenticated key exchange ("PAKE") protocol. A challenge response is encrypted with the cryptographic key to generate an encrypted challenge response. A user identifier and the encrypted challenge question are transmitted to a relying party. The encrypted challenge response can be verified by the relying party by retrieving the first substitution string based on the user identifier, generating the cryptographic key using the first substitution string as an input to the PAKE protocol, decrypting the encrypted challenge response using the cryptographic key, and verifying the challenge response so as to authenticate the user.

20 Claims, 4 Drawing Sheets

(56) References Cited

U.S. PATENT DOCUMENTS

| | | | |
|---|---|---|---|
| 9,252,952 B2* | 2/2016 | Morrison | G06F 21/32 |
| 9,274,607 B2 | 3/2016 | Delean | |
| 9,288,669 B2 | 3/2016 | Burch et al. | |
| 9,355,239 B2 | 5/2016 | Bandyopadhyay et al. | |
| 9,390,252 B2 | 7/2016 | Haberman | |
| 9,430,634 B1 | 8/2016 | Dotan et al. | |
| 2009/0165121 A1* | 6/2009 | Kumar | G06F 21/316 726/19 |
| 2010/0197352 A1 | 8/2010 | Runstedler et al. | |
| 2013/0159699 A1* | 6/2013 | Torkkel | H04L 9/0897 713/155 |
| 2013/0212674 A1 | 8/2013 | Boger et al. | |
| 2014/0101752 A1* | 4/2014 | Hrybyk | G06F 21/31 726/17 |
| 2014/0181523 A1* | 6/2014 | Morrison | G06F 21/32 713/171 |
| 2014/0250522 A1 | 9/2014 | Wang et al. | |
| 2014/0310805 A1* | 10/2014 | Kandekar | H04L 63/083 726/19 |
| 2015/0372810 A1* | 12/2015 | Miller | G06F 3/04883 713/183 |
| 2016/0078210 A1 | 3/2016 | Lymberopoulos et al. | |
| 2016/0149707 A1* | 5/2016 | Follis | G06Q 10/00 713/176 |
| 2016/0239687 A1 | 8/2016 | Herger et al. | |
| 2016/0246956 A1 | 8/2016 | Mankowski | |
| 2016/0292410 A1 | 10/2016 | Lu et al. | |
| 2016/0330027 A1 | 11/2016 | Ebrahimi | |

OTHER PUBLICATIONS

Sae-Bae, Napa, et al. "Biometric-rich gestures: a novel approach to authentication on multi-touch devices." Proceedings of the SIGCHI Conference on Human Factors in Computing Systems. ACM, 2012.

* cited by examiner

GESTURE-EXTRACTED PASSWORDS FOR AUTHENTICATED KEY EXCHANGE

CROSS-REFERENCE

This application claims to the benefit of priority from U.S. Provisional Patent Application No. 62/492,070 entitled "GESTURE-EXTRACTED PASSWORD FOR AUTHENTICATED KEY EXCHANGE" which was filed Apr. 28, 2017, the contents of which are hereby incorporated by reference in their entirety.

BACKGROUND

Access control systems may use one or more authentication factors to verify an individual's identity. For example, authentication factors may include "something-you-know," "something-you-have," and "something-you-are." Some access control systems may require elements from two or three of these categories to provide two- or three-factor authentication.

Biometrics may provide the "something-you-are" factor used for identification and authentication. Biometrics can be coupled with other categories of factors, such as "something-you-have" and "something-you-know," to achieve two- and three-factor authentication when greater assurance is required than a single factor can provide. Biometric traits may include, for example, biological (e.g., fingerprint, iris, hand geometry, etc.) and behavioral (e.g., gait, gesture, keystroke dynamics, etc.) characteristics that reliably distinguish one person from another.

As the availability and use of inexpensive mobile computing devices becomes more widespread, information security and privacy are critical to providing assurance that users of internet-based systems are protected. However, few applications and interfaces take into account the unique problem of information security and privacy in regard to use by the elderly and disabled, especially in view of the numerosity and complexity of passwords in today's internet-based systems. For example, people who suffer from a cognitive or physical disorder can have difficulty correctly entering a Personal Identification Number ("PIN") on a keyboard or recalling the correct sequence of letters in a password. The reliance on services provided through cloud and web-based systems over unsecured public networks exposes the population, especially by the elderly and disabled, to increased security risk. This risk is most evident in the field of telemedicine, which relies on the use of telecommunications to remotely provide medical information and services and to securely and reliably transfer medical information and services from one place to another.

SUMMARY

Various embodiments relate to a method for gesture-based multi-factor authentication performed by a user computing system. An example method includes receiving a gesture password from a user. The gesture password is mapped to a first substitution string. The first substitution string is securely stored on the user computing system. A cryptographic key is generated using the first substitution string as an input to a password authenticated key exchange protocol. A challenge response is encrypted with the first cryptographic key to generate an encrypted challenge response. A first authentication message including the encrypted challenge response and a plaintext user identifier associated with the user is transmitted to a relying party computing system. The encrypted challenge response can be verified by the relying party computing system by retrieving the first substitution string based on the user identifier, generating the cryptographic key using the first substitution string as an input to the password authenticated key exchange protocol, decrypting the encrypted challenge response using the cryptographic key, and verifying the challenge response so as to authenticate the user.

Various embodiments relate to another method for gesture-based multi-factor authentication performed by a relying party computing system. An example method includes receiving a first authentication message comprising from a user computing system. The first authentication message includes a user identifier associated with a user and an encrypted first challenge response. The encrypted first challenge response is generated by encrypting a first challenge response using a cryptographic key. The cryptographic key is generated using a substitution string as an input to a password authenticated key exchange protocol. The substitution string is associated with a gesture password from the user. The substitution string associated with the user identifier is retrieved. The cryptographic key is generated using the retrieved substitution string as an input to the password authenticated key exchange protocol. The encrypted first challenge response is decrypted using the cryptographic key to generate the first challenge response. The first challenge response is verified so as to authenticate the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
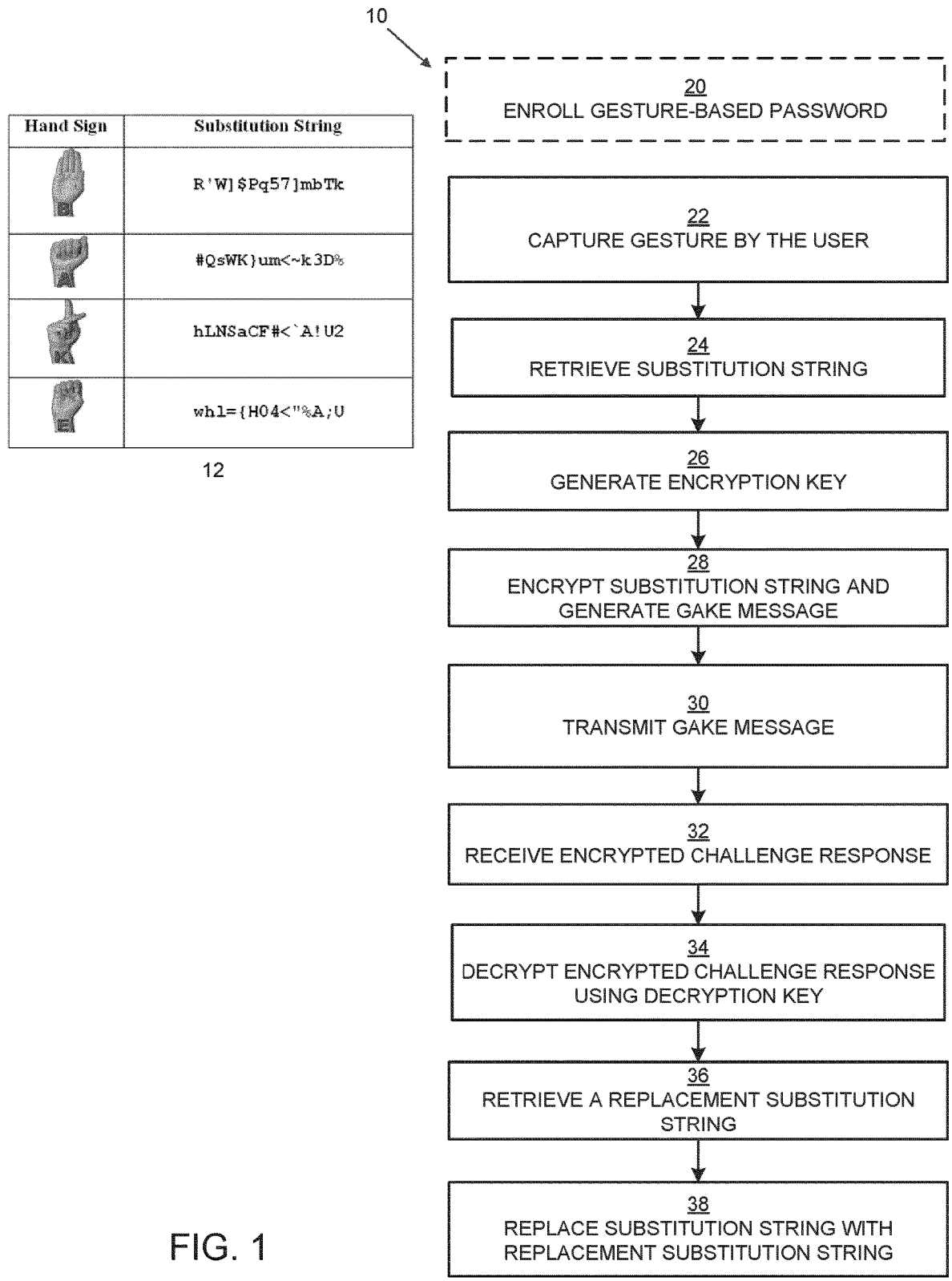
FIG. 1 is a flow diagram illustrating a method of transmitting a GAKE message, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Authentication factors for access control systems may include "something-you-know," "something-you-have," and "something-you-are" factors. Access control systems typically collect values for each authentication factor category separately, for example, utilizing a token reader, a keyboard, and a biometric sensor for three-factor authentication. However, binary data collected from biometric sensors can contain rich information content not limited to only the physiological and behavioral characteristics needed to support biometric matching. As the availability and use of inexpensive mobile computing devices becomes more widespread, the wide varieties of biometric sensors they incorporate are becoming ubiquitous. Face, voice, gesture, and touch biometric sensors are becoming commonplace and application providers no longer need to settle on just one biometric technology for authentication.

Biometric sensor-collected data can contain human knowledge, which may provide the "something-you-know" information used for authentication. Knowledge extraction techniques applied to this data can reveal "weak" secrets expressed by an individual. These secrets are termed weak because they are something a person can easily memorize, such as a passphrase, a password, a PIN, or a gesture. Biometric-based weak secrets may extend these traditional secrets to also include a sequence of footsteps or the finger positions and hand postures used in a gesture (e.g., during communication of hand sign languages when they can be captured and then represented in a canonical form such as a character string).

A password is a "something-you-know" authentication factor which may include a string of characters that have an equivalent representation shared by communicating parties. This equivalency makes passwords useful as weak secrets in cryptographic key-agreement schemes, which require both parties to know exactly the same secret in order to establish a shared key to ensure secure communications.

Server authentication mechanisms, such as the widely deployed Transport Layer Security ("TLS") protocol, rely on strong asymmetric cryptography supported by a resource intensive Public Key Infrastructure ("PKI"). However, achieving mutual authentication using TLS is not so common. It is more likely for client authentication to rely on user passwords since most users lack the personal digital certificates needed to leverage the mutual authentication option of TLS.

Passwords and other shareable knowledge-based authentication values are typically used for client-side authentication only, with TLS serving to authenticate the server and protect client passwords in transit. Failures in TLS server authentication and the user errors have led to widespread phishing by attackers impersonating legitimate servers to capture user credentials. Consequently, there is a need to provide a strong cryptographic protocol that overcomes the shortcomings of TLS.

The term Internet of Things ("IoT") describes the ongoing evolution of the Internet into a network of smart objects. These objects are internet-connected devices that can communicate with each other and with centralized resources. Devices in the IoT can be very small in size, as long as the underlying processor is large enough to support the TCP/IP protocol using Internet Protocol version 6 ("IPv6").

Limited device size and computing capabilities present challenges to using strong cryptography when users of smart objects must authenticate their identities to gain access to systems and to communicate securely. Authentication methods that rely on the operation of a PKI can require too many computation, memory size, and bandwidth resources to support IoT implementations. Biometric authentication coupled with cryptographic techniques for symmetric key establishment can provide lightweight alternatives to PKI-based methods.

The development of lightweight cryptographic algorithms arose from the need to secure devices in the resource constrained IoT. The phrase lightweight cryptography describes the cryptographic primitives, schemes and protocols tailored to extremely constrained environments. In this description, the term "lightweight" does not mean "weak cryptography," but cryptography that is efficient when measured in terms of its execution time, runtime memory (RAM) requirements, and binary code size.

Small, low power devices such as Radio Frequency Identification ("RFID") tags, sensors in wireless sensor networks ("WSN") or more generally, in small internet-enabled appliances make up a large part of the growing IoT landscape. RFID technology has become a key enabler of modern supply-chain management and industrial logistics. WSNs have been widely adopted in applications from home automation, to environmental surveillance and traffic control to medical monitoring. When physical objects associated with biometric reference templates have been preregistered with relying parties, they can be paired with networked biometric sensors and used for mutual and multifactor authentication in access control systems.

Identity authentication is a security control used to manage risk of unauthorized access to IoT devices and information systems. Biometrics-based techniques can be used to implement access control systems to provide something-you-are options that support ease of use and Universal Access ("UA") in identity authentication systems. Biometric technology can provide inclusive identity authentication to persons with diverse abilities (e.g., to see, to hear, or to speak) when they are presented with a set of biometric type alternatives and allowed to select one that is convenient for them to use.

When biometric identity authentication can be coupled with possession objects and user knowledge, to eliminate the need for costly and cumbersome PKI-based security controls, such as TLS. When a biometric authentication factor is paired with other factors, it is possible to provide both low cost, effective, easy to use mutual and multifactor authentication systems. These systems can support universal access, and leverage BAKE and its underlying Password Authenticated Key Exchange ("PAKE") and Diffie-Hellman Key Exchange techniques to establish a channel for confidential communications.

It's hard to imagine requiring most users to properly configure and consistently manage the security of IoT products that rely on PKI-based protocols for secure authentication and confidential communications. PKI protocols such as TLS challenge even experienced information technology professionals. These security protocols are ill-suited for many home users or the elderly or infirm populations in ambient assisted living environments. Instructing users to configure TLS and to avoid collision attacks by being sure not to use a 64-bit block size block cipher algorithm such as Blowfish or 3DES in CBC mode are likely to be well beyond the technical capabilities of many users.

Though TLS protocol implementations could avoid some of the more difficult dialogs by relying on preset, limited configuration options, each IoT implementation may choose to support a different subset of cipher suites. Therefore, for two implementations to interoperate they must support protocol agility and negotiate a common ciphersuite. This ability of a protocol to be agile also allows IoT implementations to transition from old cryptographic algorithms to new ones.

The term Telebiometric Authentication Objects ("TAO") describes tagged physical objects functionally coupled with biometric sensors and connected to a telecommunications network. TAO can be used to provide strong, low cost mutual and multi-factor authentication on the IoT that support the goals of universal access in access control systems that can be convenient for people to use.

TAOs do not require users to carry individually assigned security tokens, remember complex passwords, or possess and manage cryptographic keys and public key certificates. Users can be assigned objects in their environments such as door locks, appliances, and medical devices. Persons that are enrolled in a biometric system can be associated with a set of physical objects by mapping their biometric reference template identifiers to a set of one or more unique RFID tags. Pre-registered tagged object/biometric associations can be used to provide something-you-have and something-you-are factors during identity authentication. Some biometric sensor data can contain both something-you-are and something-you-know factors. This dual factor attribute of biometrics, the ability to verify a physical identity and also collect user knowledge, can simplify the authentication process for the user while providing them the security benefits of strong, multifactor authentication.

For example, a microphone can serve as a biometric sensor that collects human input as they speak. Using a single sensor, both biometric matching data and user knowledge (i.e., in the form of a spoken password) can be collected from a single source. These factors can be combined in an access control system to enable multi-factor user authentication.

Accordingly, there is a need for a cryptographic protocol that makes use of complex, strong password strings while allowing ease of use for all users, especially those who can only accomplish or remember short, weak, and convenient passwords.

Referring generally to the figures, embodiments described herein relate generally to systems and methods for mutual and multi-factor authentication via a GAKE messaging system for generating and verifying a GAKE message. Generally, the GAKE messaging system provides multi-factor authentication of a user for a relying party without the requirement or use of a digital signature, PKI, or complex password string. The GAKE message utilizes a gesture and associated substitution string and the hybrid cryptographic technique of authenticated encryption and an authenticated key exchange to encrypt the information in the GAKE message. In other words, the GAKE message provides a user with the ability to provide a gesture-based password from the user, use an associated complex substitution string under authentication encryption, thereby providing strong authentication credentials and confidential communications, while providing an easy to use and remember gesture-based password. In some arrangements, a biometric sample used for biometric matching is captured in addition to the gesture. Subsequently, the GAKE message may be utilized to facilitate secure, encrypted transactions with the relying party (for example, a financial institution) by using the substitution string to encrypt communications. In arrangements where the GAKE message includes a biometric sample, the biometric sample is used in biometric matching against a previously enrolled biometric reference template, thereby accomplishing multi-factor authentication. Unlike passwords, biometric matching data is not a shareable authenticator since biometric reference data and biometric matching data are not equivalent.

Additionally, the GAKE messaging system facilitates the change of the underlying password strings without forcing the user to change their gesture-based authentication credentials. For example, the user may gesture a "peace sign" with two fingers as the gesture-based password and have a substitution string of "1234YUSD_%$^*00IDsdOOooM" used in the AKE protocol associated with the GAKE messaging system. As used herein, the term "gesture" refers to, but is not limited to, movements, motions, expressions, and the like, accomplished using the user's appendages, mouth, eyes, voice, face, and the like. For example, the gesture-based password could be: three gestures of rock, paper, scissors in a row; a name or phrase in sign language; foot presses in numeric order on a foot pad; speaking a phrase or name; or closing the user eyes for a period of time.

The GAKE messaging protocol ensures users never reveal their plaintext knowledge or biometric credentials to imposter recipients or man-in-the-middle observers. By using a Diffie-Hellman ("D-H") key agreement algorithm, two parties can establish a cryptographic key without ever actually exchanging the private value. The GAKE messaging system provides communicating parties assurance they know each other (e.g., mutual authentication) and aids in establishing a shared secret—a symmetric cryptographic key—for secure communications known only to them for at least the communication involving the GAKE message. The GAKE messaging system accomplishes user authentication implicitly through establishing an authenticated session key (e.g., the cryptographic key). According to various embodiments, participants in the exchange represent the knowledge information in a consistent and unambiguous format, such as a canonical encoding based on Abstract Syntax Notation One ("ASN.1"), allowing protocol participants to share precisely the same substitution string (e.g., the one associated with the user's gesture, relying party's stored substitution string) required to operate the protocol. According to various arrangements, the GAKE messaging system may be used to authenticate a user (e.g. an account holder at a financial institution) to facilitate secure, encrypted transactions with the financial institution.

The GAKE messaging system provides technical solutions to computer-centric and internet-centric problems associated with conventional authentication systems. The GAKE messaging system protocol ensures that communicating parties never reveal their knowledge or credentials to imposter recipients or man-in-the-middle observers. Further, the GAKE messaging system provides mutual authentication while avoiding the TLS server-specific authentication errors and user errors that have resulted in data breaches and phishing attacks. Additionally, the GAKE messaging system protocol overcomes the TLS and other server authentication systems limitations of mutual authentication procedures being dependent on personal (e.g., on possession of the user) digital certificates. The GAKE messaging system overcomes this limitation by leveraging a strong substitution string associated with an easy to remember gesture-based password in the GAKE messaging system protocol and providing for a strong, lightweight alternative to TLS and other server authentication systems. According to various embodiments, the GAKE message further provides a more efficient and effective authentication mechanism by providing multi-factor and mutual authentication from a biometric in place of TLS or other server authentication options when only a challenge response mechanism is used.

The GAKE messaging system provides technical solutions to computer-centric and internet-centric problems associated with conventional biometrics and authentication systems by providing confidentiality of PII without the use of tokenization or a PKI. By using cryptography that does not require the support of a PKI, the GAKE messaging system reduces the processing power and memory currently required to achieve multi-factor and mutual authentication on resource constrained devices. Additionally, the embodiments herein utilize a strong key exchange mechanism that utilizes a symmetric encryption and decryption method that may be 100 to 10,000 times faster than authentication protocols using asymmetric encryption algorithms while maintaining the same, or greater, protection of the underlying passcode information in the authentication data exchange between the communicating parties. For example, the key exchange mechanism gives protection against objectively weak password strings by relying on knowledge shared by the communicating parties and providing for multi-factor authentication and can provide forward secrecy when fresh random values are used each time the protocol is operated. The encryption provides strong protection without having to dedicate processing power or resources to tokenizing and detokenizing the PII.

When coupled with lightweight cryptography, the GAKE messaging system can ensure the confidentiality of communications. When fresh random values are chosen each time the underlying Key Exchange protocol (e.g., Diffie-Hellman) is operated, the GAKE message thwarts phishing and man-in-the-middle attacks. Therefore, the GAKE messaging system can manage the security risk of unauthorized access to IoT devices and the information and communications technology systems to which they connect. Further, the GAKE messaging system is suitable for use in the constrained environments of the IoT, as the messaging system provides the cryptographic strength needed to protect sensitive user credentials during authentication. Specifically, the GAKE messaging system provides user convenience of easy to remember passwords while ensuring complex and changing inputs to underlying key exchange protocols because the keys are derived using strong, password substitution strings that can be refreshed.

These problems arise out of the use of computers and the internet because biometric processing and key exchanges cannot exist without the use of computers and the internet. Accordingly, problems relating to authentication between parties communicating over electronic mediums arise out of computers and the internet.

Referring to FIG. 1, a flow diagram of a method 10 of generating a GAKE message is illustrated, according to an example embodiment. The method 10 is performed to enable the user to execute a gesture and, through a securely stored associated substitution string, have secure communications with a relying party using an authenticated encryption mechanism. All the user provides is a gesture and, in some arrangements, a user identifier. The GAKE messaging system captures the gesture, generates a cryptographic key based off of the captured gesture and associated substitution string, and generates the GAKE message. The method 10 is shown in connection with a user that manages the user computing system 402 of FIG. 4. However, the method 10 may be similarly performed by other systems and devices.

The method 10 begins at 20 when the user enrolls a gesture-based password with a relying party as part of a biometric system enrollment process. The enrollment process includes capturing the gesture by the user, associating it with a substitution string that is complex and strong, and storing the substitution string securely on a user device. Enrollment is completed when the gesture-based password and substitution string are associated on the user device and the stored substitution string is associated with a user identifier unique to the user on the relying party computing system. In various arrangements, the user also enrolls a biometric reference sample that is used to generate a biometric reference template to be used to provide an additional authentication mechanism. Generally, the enrollment process includes the user providing a plurality of biometric samples. In some embodiments, the initial biometric sample is taken at the relying party's location using a biometric sensor. In other embodiments, the user must have their plurality of initial biometric samples taken at an establishment managed by a biometric service provider ("BSP"). However, in other embodiments, the initial biometric sample is taken on the user's computing system, for example on a mobile device. The biometric sample may be, for example, a finger print, a retina scan, a voice profile, etc.

At 22, a gesture is captured from the user. The gesture is captured by a biometric sensor or similar device. The gesture can include, but is not limited to, making a first with the right hand of the user, giving a thumbs up with either hand, saying the user's name, touching a panel of numbers in order, and the like. As will be appreciated, the gesture-based password can vary in simplicity and type, so as to be tailored to a user's specific cognitive or physical disorder. Additionally, the GAKE messaging system allows for one or more gestures to be used for a plurality of authentication systems. For example, a user may enroll the same gesture with multiple relying parties and have various substitution strings active with each of the multiple relying parties. Accordingly, the user only needs to remember one gesture in order to sign-in (e.g., authenticate) with the multiple relying parties, as the GAKE messaging system securely stores the substitution string on the user's device and manages each substitution string with its associated relying party. In some arrangements where a biometric sample from the user is captured, the captured biometric sample is first transmitted to a BSP to be processed into biometric data.

At 24, the substitution string, associated with the gesture-based password and securely stored on the user device, is retrieved. The substitution string acts as a strong password in contrast to the relatively weak password provided by the gesture-based password captured at 22. In some arrangements, the GAKE messaging system may require the user to provide a user identifier in addition to providing the gesture-based password. This may be provided by simply typing in the user identifier.

An example gesture-based password to substitution string mapping 12 is illustrated in FIG. 1. As shown in the mapping 12, different hand gestures map to different complex substitution string elements. For example, the American Sign Language ("ASL") sign for the letter "B" maps to R'WJ$Pq57]mbTk, the ASL sign for the letter "A" maps to # QsWK}um<~k3D%, the ASL sign for the letter "K" maps to hLNSaCF #<'A!U2, and the ASL sign for the letter "E" maps to whl={H04<"% A;U. The substitution string used as an input to the PAKE protocol can include one or more of the substitution string elements. For example, if the user's gesture-based password is "BAKE," the substitution string used as an input to the PAKE protocol may be R'WJ$Pq57]mbTk # QsWK}um<~k3D %hLNSaCF#<'A!U2whl={H04<"% A;U, which is a concatenation of the substitution string elements for B, A, K, and E. The substitution string that is used as an input to the PAKE protocol can be thought of as an effective password.

At 26, a symmetric key is created using the substitution string via an agreed-upon encryption algorithm. The encryption algorithm can be, for example, the D-H protocol or other PAKE exchange protocols. In some arrangements, the PAKE protocol is ITU-T Recommendation X.1035 (2007). The PAKE used may comply with the standards outlined in the ISO/IEC 11770-4 standard. As discussed previously, both parties must have pre-established the shared substitution string that will be used by both parties to generate the same keys.

At 28, the substitution string retrieved at 24 is encrypted using the symmetric key generated at 26, and a GAKE message is generated that includes the encrypted substitution string and a plaintext user identifier associated with the user. The GAKE message can also include other elements, such a time stamp token ("TST"), a challenge question, a challenge response, a possession identifier, a biometric, and/or other elements. Each of such elements may be encrypted using the cryptographic key.

For example, the GAKE message may include one or more TSTs. Although not shown in FIG. 1, in some arrangements, a TST may be requested from a time stamp authority ("TSA"). In those arrangements, the TST is requested by generating a hash of at least one of the gesture-based password, the substitution string, or the biometric sample (when applicable), which is used as an input to a trusted time stamp process. For example, in one embodiment, the hash is transmitted to the TSA that cryptographically binds the hash to a time stamp to generate the TST. The TST can be subsequently included in the encryption algorithm as the plaintext provided along with a GAKE message. In other arrangements, a non-trusted time stamp (e.g., local to the user computing system) may be included. As the TST provided by the TSA is already cryptographically protected as a signed object, in some arrangements, it is in the unprotectedAttrs component of a GAKE message that is generated using the NamedKeyEncryptedData message type of the X9.73 CMS—ASN.1 and XML standard.

The GAKE message may also include one or more challenge questions and/or challenge responses. It should be understood that several challenge questions and responses can be used to provide mutual authentication between multiple parties. For example, a first challenge question/response can be performed to authenticate the user with the relying party, and the second challenge/response can be performed to authenticate the relying party with the user. For example, a first challenge question in this instance is implied by the relying party as a request for the user to provide its credentials to the relying party. The first challenge response can therefore include the user's credentials provided by the user to the relying party. The second challenge question can be a request for the relying party to provide its credentials to the user, and the second challenge response can include the relying party's credentials. In another arrangement, the second challenge question may be an integer N that is encrypted with the cryptographic key. The second challenge response may be a variant of the integer N, such as N+1, which is also encrypted with the cryptographic key. Upon receiving the second challenge response from the relying party, the user can decrypt the second challenge response and verify the content, which proves that the relying party was able to decrypt the second challenge question, thereby establishing mutual authentication. The challenge question-response framework provides protection against man-in-the-middle or phishing attacks because an unauthorized source would lack the credentials and knowledge to respond appropriately. A challenge question and/or response can be included in the GAKE message in plaintext or it can be encrypted using the cryptographic key.

In other arrangements, GAKE message may include other plaintext content, such as a Uniform Resource Identifier ("URI"), which is a string of characters used to identify a source. Such identification enables interaction with representations of the resource over a network, such as the internet of things, using specific protocols. Schemes specifying a concrete syntax and associated protocols define each URI. The most common form of URI is a Uniform Resource Locator ("URL"). The URI can be used in the GAKE messaging system in place of the challenge response. For example, a URI to an agreed upon location could be used in the plaintext.

In some arrangements, the GAKE message is structured using CMS type NamedKeyEncryptedData, which is a cryptographic message syntax defined in the X9.73 CMS—ASN.1 and XML standard. NamedKeyEncryptedData allows for the use of the "keyName" component to provide the additional user identifier information within the GAKE message. In some embodiments, the keyName component of type NamedKeyEncryptedData is defined as a value of ASN.1 type OCTET STRING, which is an opaque string that could contain any type or format of data. However, when a keyName value is used to generate a GAKE message, the symmetric key is identified indirectly using an account identifier or login of the user.

In some arrangements, the generated GAKE message may include a possession identifier. In some arrangements, the possession identifier is included within the generated GAKE message and protected by encryption. The possession object identifiers are associated with the user identifier to confirm a "something-you-have." The possession object identifiers, being the "something-you-have factor," could be the device that captured the gesture or the user device that securely stores the effective password. In order to be authenticated, the user associated with the user identifier would have to possess the object identifier when providing the biometric sample. For example, the GAKE message would fail to generate (or fail a validation attempt by a relying party) if the provided biometric sample was extracted from a biometric sensor with the physical address "ABC" but the user identifier only enrolled a possession object identifier for biometric samples to be submitted from a biometric sensor with the physical address of "EFG."

At 30, the generated GAKE message including the user identifier is transmitted to a relying party. In some arrangements, the user identifier is included within the GAKE message or is transmitted separately. The user identifier represents an account login, user name, or similar identifier recognizable by the relying party to be associated with the secret knowledge factor. The user identifier allows the relying party to retrieve the previously enrolled stored substitution string. The process of a relying party receiving a GAKE message is further outlined below in method 200 of FIG. 2.

At 32, the user receives an encrypted challenge response from the relying party. The challenge response is encrypted using a cryptographic key derived from the stored substitution string by the relying party. As will be appreciated, the cryptographic key used by the relying party to encrypt the challenge response is the same cryptographic key generated by the user at 26.

At 34, the user decrypts the encrypted challenge response using a decryption key. The decryption key is created using the substitution string via an agreed-upon decryption algorithm. The decryption algorithm can be, for example, the D-H protocol or other PAKE exchange protocols. Once the challenge response is deemed appropriate the user and relying party have mutually authenticated and communicate by encrypting messages using the substitution string.

In some arrangements, the decrypted challenge response from the relying party includes a replacement substitution string at 36. The replacement substitution string (e.g., a second substitution string) is sent by the relying party to replace the current substitution string and to be used to generate GAKE messages and communications during subsequent authentication events between the user and the relying party. As will be appreciated, replacing the substitution string does not alter the gesture-based password and replacing the substitution string further strengthens and protects authentication events and communications between the user and relying party. In some arrangements, the user sends a GAKE message that includes confirmation of receiving the replacement substitution string. In those arrangements, the GAKE message is encrypted using a cryptographic key derived from the substitution string or the replacement substitution string.

As will be appreciated, the method 10 is transparent to the user and is easy to use. From the user's point of view, the user has to provide only a gesture to generate a GAKE message. For example, the user interacts with the GAKE messaging system (e.g., accesses an application on computing device) and holds up three fingers (e.g., the gesture-based password) at a biometric sensor. The GAKE messaging system captures the gesture, retrieves the substitution string, generates the symmetric key, encrypts a challenge response, and generates the GAKE message. Accordingly, to generate the GAKE message, the user need only remember the gesture and the user does need to update the gesture-based password, even if the GAKE messaging system updates the associated substitution string.

Figure 2:
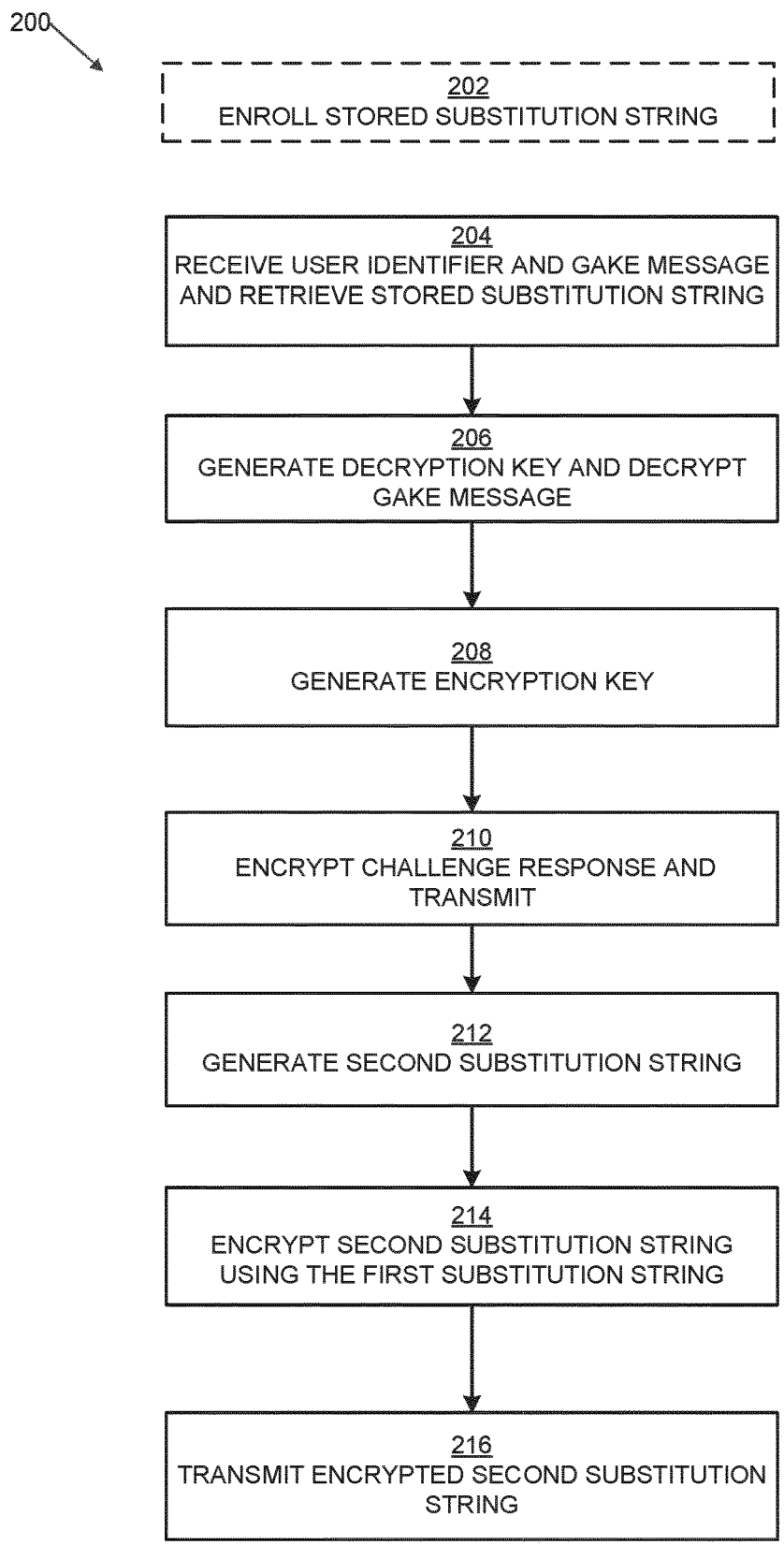
FIG. 2 a flow diagram illustrating a method of receiving a GAKE message, according to an example embodiment.

Referring to FIG. 2, a flow diagram of a method 200 of receiving a GAKE message is illustrated, according to an example embodiment. The method 200 is described in connection with a relying party receiving a GAKE message from a user. According to various embodiments, the relying party is an entity that manages the relying party computing system 404 of FIG. 4. However, the method 200 may be similarly performed by other systems and devices.

The method 200 begins at 202 when a user enrolls a gesture-based password with the relying party as part of a biometric system enrollment process. The enrollment process includes capturing the gesture by the user, associating it with a substitution string that is complex and strong, and storing the substitution string securely on a user device. Enrollment is completed when the gesture-based password and substitution string are associated on the user device and the stored substitution string is associated with a user identifier unique to the user on the relying party computing system.

At 204, the relying party receives a GAKE message and user identifier from a user. Using the user identifier, the relying party retrieves the stored substitution string associated with the user.

At 206, the relying party derives a decryption key based on the stored substitution string in the database associated with the user identifier and the agreed-upon decryption algorithm. The decryption algorithm can be, for example, the D-H protocol or other PAKE exchange protocols. As discussed previously, both parties must have pre-established the shared substitution string that will be used by both parties to generate the same keys. The relying party uses the decryption key to decrypt the GAKE message and retrieve the challenge response.

At 208, the relying party creates the symmetric key using the substitution string via the agreed-upon encryption algorithm. The encryption algorithm can be, for example, the D-H protocol or other PAKE exchange protocols.

At 210, the challenge response to the challenge question in the GAKE message is encrypted with the symmetric key and the encrypted challenge response is transmitted by the relying party to the user. Encrypting the challenge response provides protection against man-in-the-middle or phishing attacks because an unauthorized source would lack the credentials and knowledge to question appropriately. Subsequent communications between the relying party and user are encrypted using the substitution string and the GAKE messaging system.

At 212, the relying party decides to change the substitution string and generates a second stored substitution string and associates the second substitution string with the corresponding user identifier. As will be appreciated, the relying party may determine to update the substitution string on a timely schedule (e.g., once a month, once a week, etc.) or at the conclusion of every authentication event or communication session. At 214, the second substitution string is encrypted using the cryptographic key derived using the first substitution string.

At 216, the encrypted second substitution string is transmitted by the relying party to the secure module on the user device. The second substitution string (e.g., a replacement substitution string) is sent by the relying party to replace the current substitution string and to be used to generate GAKE messages and communications during subsequent authentication events between the user and the relying party. As will be appreciated, replacing the substitution string does not alter the gesture-based password and replacing the substitution string further strengthens and protects authentication events and communications between the user and relying party.

In some arrangements, the relying party will store the current substitution string (e.g., the second substitution string) and the previous substitution string (e.g., the first substitution string) to allow for authentication and communication with the user if the transmission of the encrypted second substitution string at 216 fails. In those arrangements, the relying party will receive a GAKE message and user identifier and derive a decryption key using the second substitution string. The relying party decrypts the GAKE message using the decryption key and the decryption algorithm. If the decryption fails, the relying party can retrieve the first substitution string and derive an "old" decryption key using the first substitution string. The relying party decrypts the GAKE message using the old decryption key and the decryption algorithm. If the decryption is successful, the relying party can accept authentication and assume that the transmitted encrypted second substitution string at 216 was not properly stored on the secure element in the user device.

Figure 3:
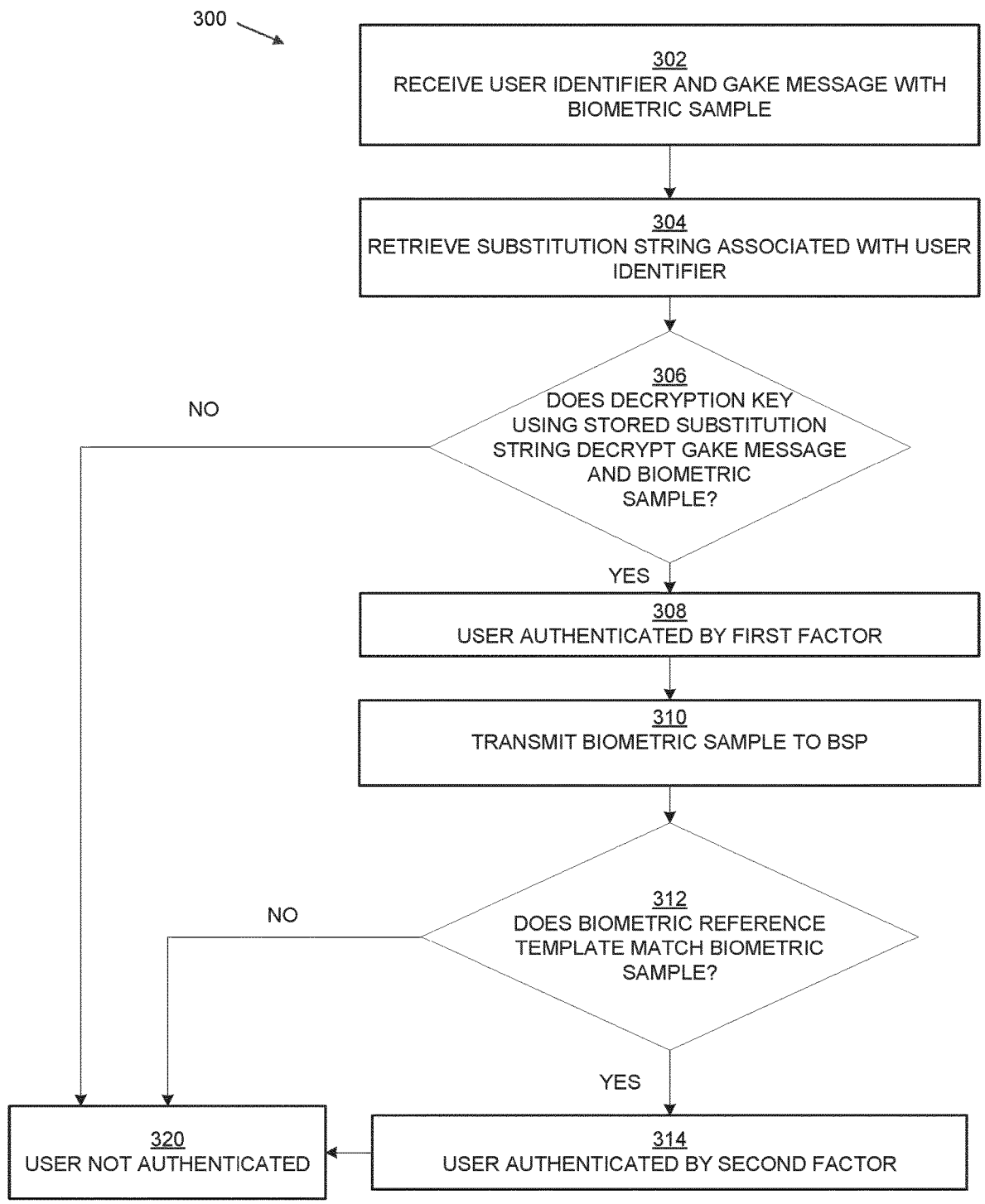
FIG. 3 is a flow diagram illustrating a method of verifying a received GAKE message that includes a biometric sample, according to an example embodiment.

Referring to FIG. 3, a flow diagram of a method 300 of validating a GAKE message that includes a biometric sample is illustrated, according to an example embodiment. The method 300 is described in connection with a relying party and a BSP. According to various embodiments, the relying party is an entity that manages the relying party computing system 404 of FIG. 4, and the BSP is an entity that manages the BSP computing system 408 of FIG. 4. However, the method 300 may be similarly performed by other systems and devices. The method 300 includes receiving a GAKE message that provides the relying party with all information needed to verify the biometric information of a user included in the GAKE message. The GAKE message can subsequently be used to provide two-factor authentication via a "something-you-have" factor in the form of the substitution string associated with the gesture-based password of the user and a "something-you-are" factor in the form of the user's biometric sample.

The method 300 begins when the relying party receives a GAKE message and user identifier, at 302. At 304, the relying party uses the user identifier in the GAKE message to retrieve the stored substitution string for the user. In some embodiments, after receiving the message, at 304, the relying party determines if the requesting user is registered with the relying party and has a biometric reference template on file with the BSP computing system 408. If the requestor is not registered, the relying party may deny the authentication request. In other embodiments where no biometric enrollment has occurred, the relying party may require the user to provide another biometric sample in person to authenticate the message.

At 306, the relying party uses the stored substitution string to generate a symmetric key using the agreed-upon commutative encryption algorithm. Using the protocol and the stored knowledge factor, a cryptographic key is derived. The generated key is used to decrypt the GAKE message via the same encryption algorithm that was used by the user to encrypt the GAKE message. If the decryption key does not decrypt the GAKE message, the user is not authenticated at 320.

At 308, the GAKE message is properly decrypted and the biometric sample in the GAKE message is recovered. Because the decryption was successful the user is authenticated by a first authentication factor as the GAKE message sender has access to the proper substitution string and agreed upon GAKE messaging protocol.

At 310, the relying party transmits a biometric match request to the BSP. The biometric match request includes the biometric sample retrieved from GAKE message and the user identifier. In some arrangements, the relying party could retrieve a stored biometric reference template associated with the user identifier and submit that, along with the biometric sample, to the BSP for verification. Alternatively, the request, at 310, could be for an identification. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system.

At 312, the relying party receives the match value from the BSP. The BSP provided match value is indicative of whether the biometric sample matches the biometric reference template associated with the user identifier. The BSP then generates and transmits a match value to the relying party. For example, the match value is a binary value indicating a match or a non-match. The comparison of the biometric sample and the biometric reference template uses a biometric processing algorithm or a biometric matching algorithm. If the sample matches the reference template, then a positive authentication value is transmitted to the relying party at 312. If the sample does not match the reference template, then a negative authentication value is transmitted to the relying party at 312.

At 314, the relying party received a positive match value and authenticates the user by a second factor. In some arrangements that include a TST, the relying party can also verify a TST associated with a GAKE message by completing a "hash check" with the information. This process includes generating a hash of the original data, appending the timestamp given by the TSA, and calculating the hash of the result (e.g., the hash of the original data with the appended time stamp). In some embodiments, the relying party also matches a possession object identifier included with the biometric sample to a stored possession object identifier associated with the user's user identifier to authenticate the user by a third factor.

At 320, the relying party received a negative match value and the user is not authenticated by the biometric authentication factor. The relying party may determine to authenticate the user based off of the successful authentication by the first factor at 308.

Figure 4:
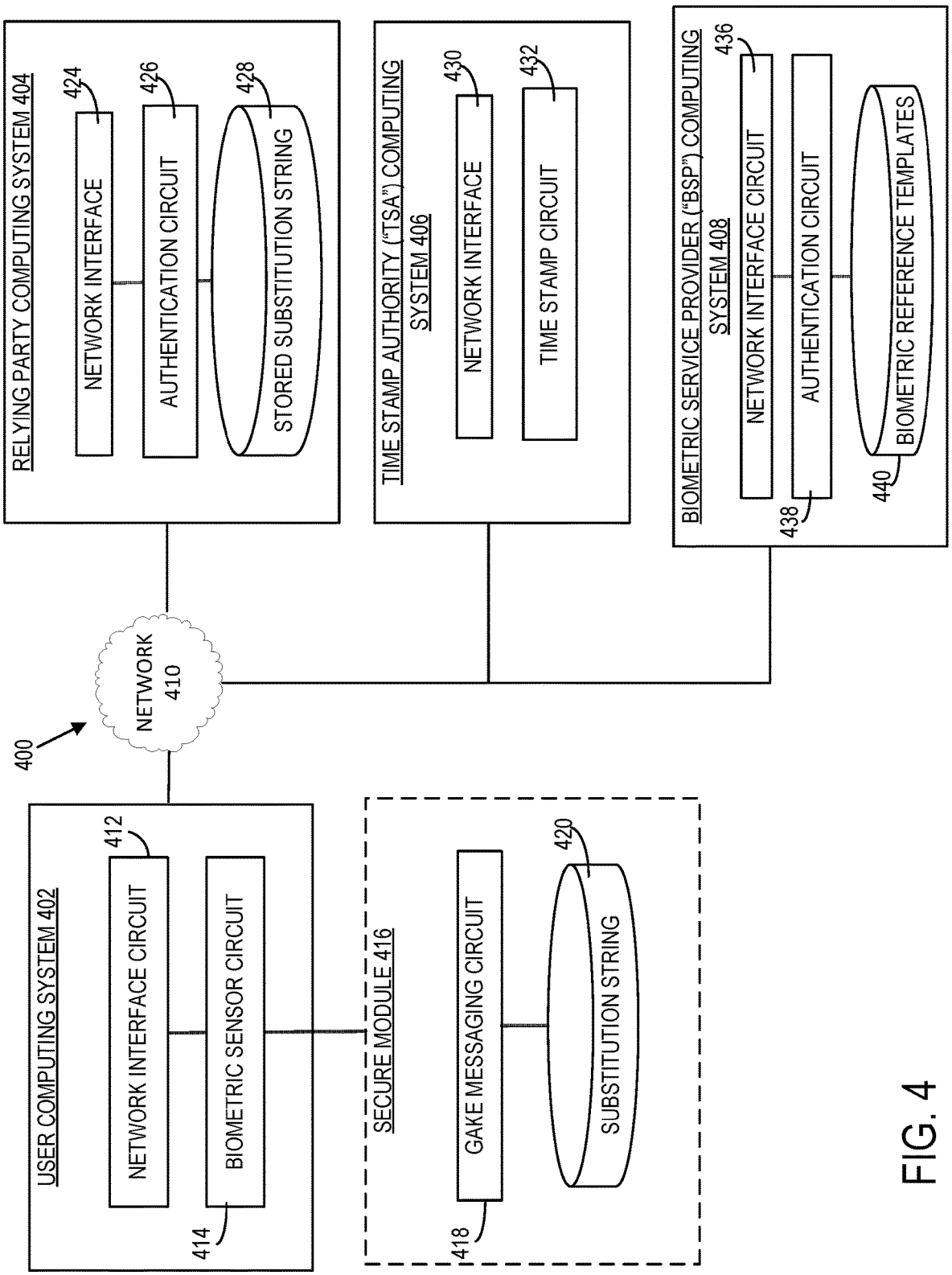
FIG. 4 is a schematic diagram of a GAKE messaging system, according to an example embodiment.

FIG. 4 is schematic diagram of a GAKE messaging system 400 for generating and validating GAKE messages, according to an example embodiment. The GAKE messaging system 400 includes a user computing system 402, a relying party computing system 404, a TSA computing system 406, and a BSP computing system 408. Each of the user computing system 402, the relying party computing system 404, the TSA computing system 406, and the BSP computing system 408 is in operative communication with the others via a network 410. The mechanisms allow for the generation of a complex, strong password from a simple gesture by the user and captured on a biometric (or similar) sensor. Specifically, the GAKE messaging system 400 makes it possible for the user to be authenticated by a relying party (e.g., merchant, financial institution, service provider, etc.) by encrypting a challenge question, and subsequent communications, using a symmetric key generated by a substitution string associated with the gesture-based password. The network 410 may include, for example, the internet, cellular networks, proprietary cloud networks, telebiometric objects on the IoT, and the like.

The user computing system 402 includes a network interface circuit 412, a biometric sensor circuit 414, and a secure module 416. The network interface circuit 412 is structured to facilitate operative communication between the user computing system 402 and other systems and devices over the network 410. The user computing system 402 may include smartphones, tablet computing systems, laptop computing systems, desktop computing systems, PDAs, smart watches, smart glasses, tablets, etc.

The biometric sensor circuit 414 is structured to capture a gesture and, in some arrangements, biometric data. For example, the sensor can be structured to capture a gesture from a fingerprint, voice print, or other biometric marker. Generally, the biometric sensor circuit 414 is any technology type that supports the capture of biometric data. In one embodiment, the biometric sensor is connected to a floor pad operably connected to the user computing system 402 by collecting both the walking and stepping patterns from the walking samples for biometric matching using a two-dimensional biometric sensor grid. The order and identities of tiles encountered as participants traverse the grid could convey the gesture-based password through. In some arrangements, the raw biometric data captured by the biometric sensor circuit 414 is processed by a BSP to generate a biometric reference template. In some arrangements, a plurality of biometric samples captured from an individual are processed to create the biometric reference template.

The secure module 416 is structured to securely protect the substitution string associated with the gesture-based password, generate the GAKE message, and operate the GAKE messaging protocol. The secure module includes the GAKE messaging circuit 418 and the substitution string database 420. The secure module 416 can be accessed from the user device by a user that has access to the user device. This access may include a finger print scan, a simple password, no password, and the like.

The GAKE messaging circuit 418 is structured to generate a GAKE message and, subsequent to authentication, the GAKE messaging circuit 418 facilitates encrypted communications between the user computing system 402 and the relying party computing system 404. To generate a GAKE message, the GAKE messaging circuit 418 receives the gesture captured by the biometric sensor circuit 414 and derives a cryptographic key using the substitution string in the substitution string database 420. The GAKE messaging circuit 418 derives a cryptographic key using an agreed-upon encryption algorithm (e.g., encryption protocol), for example the D-H protocol, or similar commutative encryption algorithms, etc. Both parties must have pre-established the protocol operation, as well as shared knowledge of the substitution string both parties will use with the commutative encryption algorithm protocol to generate cryptographic keys used to encrypt and decrypt data in the GAKE message. The derived cryptographic key is used by the GAKE messaging circuit 418 to encrypt a challenge question and generate a GAKE message. The GAKE messaging circuit 418 also facilitates the replacement of a substitution string in the substitution string database 420. An example method of generating a GAKE message is described in greater detail above in method 10 of FIG. 1.

The relying party computing system 404 includes a network interface circuit 424, an authentication circuit 426, and a stored substitution string database 428. Generally, the relying party computing system 404 receives a GAKE message from the user computing system 402 and verifies authenticity of the GAKE message. With the received GAKE message, the relying party computing system 404 is also able to verify data integrity and origin authenticity of any content within the GAKE message and the GAKE message as a whole. Specifically, if the challenge question was encrypted using the cryptographic key derived from the agreed-upon encryption algorithm or commutative encryption algorithm. In some arrangements, the relying party is able to additionally authenticate the user through a biometric sample stored in the GAKE message being matched against a biometric reference template. If the GAKE message is verified to have been encrypted using the proper substitution string, the relying party can trust the data integrity and origin authentication. Origin authenticity is achieved if the same symmetric key associated the substitution string is generated and matches the stored substitution string in the stored substitution string database 428. The network interface circuit 424 is structured to facilitate operative communication between the relying party computing system 404 and other systems and devices over the network 410.

The authentication circuit 426 is structured to facilitate the authentication of the user with the GAKE message and user identifier. The authentication circuit 426 is structured to derive a cryptographic key using an agreed-upon encryption algorithm (or encryption protocol), for example the D-H protocol, or other commutative encryption algorithms, etc. The authentication circuit 426 derives a decryption key based on the stored substitution string in the database 428 associated with the user identifier. Upon receipt of the GAKE message, the relying party computing system 404 retrieves a stored substitution string in the database 428 associated with the user identifier and uses it to generate the symmetric key and decrypt the GAKE message. For example, upon receiving the user identifier of "John Smith" (e.g., John Smith's username, email address, customer number, Social Security Number, driver's license number, etc.), the authentication circuit 426 will look for John Smith's account in the database 428 and retrieve the stored substitution string. The authentication circuit 426 is also structured to update the substitution string and transmit the replacement substitution string to the secure module 416 on the user computing system 402. Example methods 200 of verifying a GAKE message is discussed above in FIG. 2.

In some arrangements where the GAKE message includes a biometric sample, the authentication circuit is structured to further facilitate the authentication of a biometric sample in a GAKE message with a biometric reference template stored on the BSP computing system 408. For example, upon receiving a GAKE message, the relying party computing system 404 automatically begins verification of the signature, unencrypts a GAKE message, and transfers the captured biometric sample to the BSP computing system 408 for matching. The biometric sample can be in the form of a simple oblique value (a string of octets) or structured content that contains the biometric data value and any information needed to recover the plaintext, such as the URL address of a biometric service provider or web service, an indication of the specific biometric processing technique that was used, or any other required data or authentication information. An example method 300 of verifying a biometric in a GAKE message is discussed above in FIG. 3.

The TSA computing system 406 includes a network interface circuit 430 and a time stamp circuit 432. The TSA computing system 406 is managed by any trusted time authority that can provide a TST for a piece of information. The trusted time authority can be one that complies with the X9.95 standard, or those defined in similar standards by ISO/IEC/IETF, and satisfies legal and regulatory requirements. The network interface circuit 430 is structured to facilitate operative communication between the TSA computing system 406 and the user computing system 402 over the network 410. The time stamp circuit 432 is structured to negotiate a trusted TST, which includes receiving a hash of a piece of information and generating a trusted TST for the information for future verification. In some arrangements, the TST is generated inter-device (e.g., capturing the system time, or mobile phone time), and the TST is included in the challenge question that is encrypted in the GAKE message. In other arrangements, the TST is includes along with the GAKE message as an unencrypted attribute.

The BSP computing system 408 includes a network interface circuit 436, an authentication circuit 438, and a biometric reference template database 440. The network interface circuit 436 is structured to facilitate operative communication between the BSP computing system 408 and other systems and devices over the network 410. Generally, the BSP computing system 408 stores biometric reference templates for users and handles biometric matching requests from relying parties. Before using the GAKE messaging system 400, and in arrangements that utilize a biometric captured from a user as an additional authentication factor, the user must have enrolled with the BSP and created a biometric reference template. In some embodiments, the biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller. In other arrangements, the GAKE message processing system may create a biometric reference template from the user-provided biometric sample so that the user can be enrolled in a biometric systems for subsequent biometric authentication or identification.

The biometric reference template database 440 includes a plurality of user identifiers and corresponding biometric reference templates that are a byproduct of users enrolling in the biometric service. The user identifier can be, for example, a user name, email address, phone number, or the actual name of the customer. The user identifier may be stored in the attributes or fields of a GAKE message.

The authentication circuit 438 is structured to receive a biometric sample and an authentication request from the relying party computing system 404 over the network 410 and compare the received sample to a stored reference template. The authentication request includes a request for verification and/or identification. If the sample matches the reference template, the authentication circuit 438 transmits a positive authentication value to the relying party computing system 404. In some arrangements, the authentication circuit 438 will provide a negative matching value (e.g., indicator) if there is no matching user identifier in the biometric reference template database 440 or if the user does not have a biometric reference template for the biometric type of the biometric sample. The use of biometric matching and the GAKE messaging system is expanded further in method 300 of FIG. 3.

It should be understood that the terms "GAKE message" and "authentication message" are used herein interchangeably.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions and arrangement of the embodiments without departing from the scope of the present disclosure as expressed in the appended claims.

What is claimed is:

1. A method, comprising:
    receiving, by a user computing system, a gesture password from a user;
    mapping, by the computing system, the gesture password to a first substitution string, wherein the first substitution string is securely stored on the user computing system;
    generating, by the user computing system, a cryptographic key using the first substitution string as an input to a password authenticated key exchange protocol;
    encrypting, by the user computing system, a challenge response with the first cryptographic key to generate an encrypted challenge response; and
    transmitting, by the user computing system to a relying party computing system, a first authentication message comprising the encrypted challenge response and a plaintext user identifier associated with the user,
    wherein the encrypted challenge response can be verified by the relying party computing system by:
        retrieving the first substitution string based on the user identifier,
        generating the cryptographic key using the first substitution string as an input to the password authenticated key exchange protocol,
        decrypting the encrypted challenge response using the cryptographic key, and
        verifying the challenge response so as to authenticate the user.

2. The method of claim 1, wherein the challenge response is a first challenge response provided in response to a first challenge question, and wherein the first authentication message further comprises a second challenge question, the method further comprising:
    receiving, by the user computing system from the relying party computing system, a second authentication message comprising an encrypted second challenge response, the encrypted second challenge response generated by encrypting a second challenge response using the cryptographic key generated by the relying party computing system, the second challenge response being responsive to the second challenge question;
    decrypting, by the user computing system, the encrypted second challenge response using the cryptographic key to generate the second challenge response;
    verifying, by the user computing system, the second challenge response so as to provide mutual authentication between the user computing system and the relying party computing system.

3. The method of claim 2, wherein the second authentication message further comprises an encrypted second substitution string encrypted using the cryptographic key generated by the relying party computing system, the method further comprising:
    decrypting, by the user computing system, the encrypted second substitution string using the cryptographic key to generate the second substitution string;
    replacing, by the user computing system, the first substitution string with the second substitution string so as to associate the second substitution string with the gesture password; and
    storing, by the user computing system, the second substitution string securely on the computing system.

4. The method of claim 3, further comprising:
    transmitting, by the user computing system to the relying party computing system, a confirmation of receipt of the second substitution string,
    wherein the relying party computing system generates a second cryptographic key using the second substitution string as an input to the password authenticated key exchange protocol, and uses the second cryptographic key instead of the first cryptographic key to encrypt data to be sent to the user computing system.

5. The method of claim 3, wherein the cryptographic key is a first cryptographic key, the method further comprising:
    receiving, by the user computing system, the gesture password from the user;

mapping, by the user computing system, the gesture password to the second substitution string;

generating, by the user computing system, a second cryptographic key using the second substitution string as an input to the password authenticated key exchange protocol;

encrypting, by the user computing system, a third challenge response with the second cryptographic key to generate an encrypted third challenge response; and transmitting, by the user computing system to the relying party computing system, the plaintext user identifier and the encrypted third challenge response, wherein the encrypted third challenge response can be verified by the relying party computing system by:
   retrieving the first substitution string based on the user identifier,
   generating the second cryptographic key using the second substitution string as an input to the password authenticated key exchange protocol,
   decrypting the encrypted third challenge response using the second cryptographic key, and
   verifying the third challenge response so as to re-authenticate the user.

6. The method of claim 1,
wherein the challenge response comprises the first substitution string,
wherein the relying party computing system generates a verifying substitution string by the decrypting the encrypted challenge response using the cryptographic key, and
wherein the challenge response is verified in response to the verifying substitution string matching the first substitution string retrieved by the relying party computing system based on the user identifier.

7. The method of claim 1, further comprising:
receiving, by the user computing system, a biometric sample captured from the user; and
encrypting, by the computing system, the biometric sample with the cryptographic key to generate an encrypted biometric sample,
wherein the first authentication message further comprises the encrypted biometric sample,
wherein identity of the user can be authenticated by decrypting the encrypted biometric sample using the cryptographic key and matching the biometric sample with a biometric reference template associated with the user identifier.

8. The method of claim 7, further comprising extracting the gesture password from the biometric sample.

9. The method of claim 1, wherein receiving the gesture password from the user includes capturing a physical gesture from the user.

10. The method of claim 1, wherein the gesture password is received via a plaintext message entered by the user.

11. The method of claim 1, wherein the cryptographic key is a symmetric encryption key generated using a Diffie-Hellman key agreement algorithm.

12. A method, comprising:
receiving, by a relying party computing system from a user computing system, a first authentication message comprising:
   a user identifier associated with a user, and
   an encrypted first challenge response, the encrypted first challenge response generated by encrypting a first challenge response using a cryptographic key, the cryptographic key generated using a substitution string as an input to a password authenticated key exchange protocol, the substitution string being associated with a gesture password from the user;
retrieving, by the relying party computing system, the substitution string associated with the user identifier;
generating, by the relying party computing system, the cryptographic key using the retrieved substitution string as an input to the password authenticated key exchange protocol;
decrypting, by the relying party computing system, the encrypted first challenge response using the cryptographic key to generate the first challenge response; and
verifying, by the relying party computing system, the first challenge response so as to authenticate the user.

13. The method of claim 12, wherein the challenge response is a first challenge response provided in response to a first challenge question, and wherein the first authentication message further comprises a second challenge question, the method further comprising:
generating, by the relying party computing system, a second challenge response in response to the second challenge question;
encrypting, by the relying party computing system, the second challenge response with the cryptographic key to generate an encrypted second challenge response; and
transmitting, by the relying party computing system to the user computing system, a second authentication message comprising the encrypted second challenge response,
wherein the encrypted second challenge response can be verified by the user computing system by:
   generating the cryptographic key using the substitution string as an input to the password authenticated key exchange protocol,
   decrypting the encrypted second challenge response using the cryptographic key, and
   verifying the second challenge response so as to provide mutual authentication between the user computing system and the relying party computing system.

14. The method of claim 12, wherein the substitution string is a first substitution string, further comprising:
generating, by the relying party computing system, a second substitution string;
encrypting, by the relying party computing system, the second substitution string with the cryptographic key to generate an encrypted second substitution string;
wherein the second authentication message further comprises the encrypted second substitution string; and
wherein the user computing system is structured to:
   decrypt the encrypted second substitution string using the cryptographic key to generate the second substitution string, and
   replace the first substitution string associated with the user identifier with the second substitution string so as to associate the second substitution string with the gesture password.

15. The method of claim 14, wherein the encryption key is a first encryption key, the method further comprising:
receiving, by the relying party computing system from the user computing system, a confirmation of receipt of the second substitution string; and
generating, by the relying party computing system, a second cryptographic key using the second substitution string as an input to the password authenticated key exchange protocol, wherein the relying party computing system uses the second cryptographic key instead of the first cryptographic key to encrypt data to be sent to the user computing system.

16. The method of claim 14, wherein the cryptographic key is a first cryptographic key, the method further comprising:
receiving, by the relying party computing system from the user computing system, a third authentication message comprising the user identifier and an encrypted third challenge response, the encrypted third challenge response comprising a third challenge response encrypted using a second cryptographic key, the second cryptographic key generated using the second substitution string as an input to the password authenticated key exchange protocol, the second substitution string being associated with the gesture password from the user;
retrieving, by the relying party computing system, the second substitution string associated with the user identifier;
generating, by the relying party computing system, the second cryptographic key using the retrieved second substitution string as an input to the password authenticated key exchange protocol;
decrypting, by the relying party computing system, the encrypted third challenge response using the second cryptographic key to generate the third challenge response;
verifying, by the relying party computing system, the third challenge response so as to re-authenticate the user.

17. The method of claim 12, wherein the first authentication message further comprises an encrypted biometric sample, the encrypted biometric sample captured from the user and encrypted using the first cryptographic key;
decrypting, by the relying party computing system, the encrypted biometric sample using the first cryptographic key to generate the biometric sample; and
matching, by the relying party computing system, the biometric sample with a biometric reference template associated with the user identifier so as to authenticate an identity of the user.

18. The method of claim 17, wherein the gesture password is extracted from the biometric sample.

19. The method of claim 12, wherein the gesture password is extracted from a physical gesture captured from the user.

20. The method of claim 12, wherein the gesture password is received via a plaintext message entered by the user.

* * * * *